United States Patent
Kim et al.

(10) Patent No.: US 10,365,452 B2
(45) Date of Patent: Jul. 30, 2019

(54) ACTUATOR OF CAMERA MODULE

(71) Applicant: SAMSUNG ELECTRO-MECHANICS CO., LTD., Suwon-si (KR)

(72) Inventors: Kyung Rin Kim, Suwon-si (KR); Gyu Won Kim, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 7 days.

(21) Appl. No.: 15/656,188

(22) Filed: Jul. 21, 2017

(65) Prior Publication Data

US 2018/0149824 A1    May 31, 2018

(30) Foreign Application Priority Data

Nov. 28, 2016 (KR) .................. 10-2016-0159494

(51) Int. Cl.
| | |
|---|---|
| *G02B 7/02* | (2006.01) |
| *H04N 5/232* | (2006.01) |
| *G02B 27/64* | (2006.01) |
| *H04N 5/225* | (2006.01) |
| *G03B 13/36* | (2006.01) |

(52) U.S. Cl.
CPC ............ *G02B 7/023* (2013.01); *G02B 27/646* (2013.01); *H04N 5/2257* (2013.01); *H04N 5/23287* (2013.01); *G02B 7/021* (2013.01); *G03B 13/36* (2013.01); *G03B 2205/0076* (2013.01)

(58) Field of Classification Search
CPC ...................................... G02B 7/023
USPC ...................................... 359/824
See application file for complete search history.

(56) References Cited

U.S. PATENT DOCUMENTS

| | | | |
|---|---|---|---|
| 2013/0148950 A1* | 6/2013 | Chang ............... | G03B 35/08 396/326 |
| 2015/0304561 A1 | 10/2015 | Howarth et al. | |

FOREIGN PATENT DOCUMENTS

| | | |
|---|---|---|
| JP | 2012-147237 A | 8/2012 |
| KR | 10-0930313 B1 | 12/2009 |
| KR | 10-2013-0077216 A | 7/2013 |
| KR | 10-2015-0102966 A | 9/2015 |

\* cited by examiner

*Primary Examiner* — James C. Jones
(74) *Attorney, Agent, or Firm* — NSIP Law

(57) ABSTRACT

An actuator of a camera module includes a shape memory alloy (SMA) wire group and a driver. The shape memory alloy (SMA) wire group includes first SMA wires driving a first lens module and second SMA wires driving a second lens module. The driver configured to drive a pair of SMA wires driving different lens modules of the first and the second lens modules among the first and the second SMA wires in a same scheme.

20 Claims, 3 Drawing Sheets

ACTUATOR OF CAMERA MODULE

CROSS-REFERENCE TO RELATED APPLICATION(S)

This application claims benefit under 35 USC 119(a) of priority to Korean Patent Application No. 10-2016-0159494 filed on Nov. 28, 2016 in the Korean Intellectual Property Office, the disclosure of which is incorporated herein by reference in its entirety.

BACKGROUND

1. Field

The following description relates to an actuator of a camera module.

2. Description of Related Art

A front camera and a rear camera are mounted in a mobile device, or two cameras are mounted on one surface of a mobile device in order to obtain a wide angle image and an image having a high level of resolution.

Generally, the camera module includes a lens barrel having lenses disposed therein, a housing accommodating the lens barrel therein, and an image sensor converting an image of a subject into an electrical signal. A single focus type camera module, imaging a subject by a fixed focus, may be used as the camera module. However, in view of recent developments in camera technology, a camera module including an actuator enabling auto-focusing has been used. In addition, the camera module includes an actuator for an optical image stabilization (OIS) function, in order to suppress a resolution decrease phenomenon due to handshake.

As functions having high performance are required in a plurality of cameras mounted in the mobile device, actuators having high performance should be used in the cameras. However, when actuators having the high performance are individually used in the cameras, there is a risk that a cost of an entire system will be excessive.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An embodiment describes an actuator of a camera module in which actuators are simultaneously driven by sharing a driver integrated chip (IC).

In accordance with an embodiment, there is provided an actuator of a camera module, including: a shape memory alloy (SMA) wire group comprising first SMA wires driving a first lens module and second SMA wires driving a second lens module; and a driver configured to drive a pair of SMA wires driving different lens modules of the first and the second lens modules among the first and the second SMA wires in a same scheme.

The driver may include a driving circuit generating a same driving signal as provided to the pair of SMA wires driving the first and the second lens modules.

The driver may simultaneously provide the same driving signal to the pair of SMA wires driving the different lens modules.

The driver may sequentially provide driving signals to wires driving one of the first lens module and the second lens module in one time period.

The actuator may further include: a position detector configured to measure thermal resistances from the first SMA wires driving the first lens module and the second SMA wires driving the second lens module to detect positions of the first lens module and the second lens module.

The position detector may sequentially generate analog signals from the first SMA wires driving the first lens module and the second SMA wires driving the second lens module.

The actuator may further include: a digital converter comprising an analog to digital conversion circuit configured to sequentially receive the analog signals and generate digital signals.

The digital converter may be operated in a sample and hold scheme.

The driver may not provide the driving signals to the first and the second SMA wires from which the analog signals are generated, in the one time period.

The actuator may further include: a controller configured to generate control signals based on the digital signals, wherein the driver adjusts pulse widths of the driving signals based on the control signals.

The actuator may further include: a lens module accommodated in a frame, and configured to move in an X-axis direction or a Y-axis direction, perpendicular to an optical axis direction, wherein the first and the second SMA wires are connected to side surfaces of the lens module and the frame, respectively, to adjust a horizontal distance between the lens module and the frame.

The driver may selectively and simultaneously output a same driving signal to a pair of SMA wires driving the first and the second lens modules, among the first and the second SMA wires, to provide the driving signals to the first and the second SMA wires through one driving circuit.

In accordance with an embodiment, there is provided an actuator of a camera module, including: a shape memory alloy (SMA) wire group including first SMA wires driving a first lens module and second SMA wires driving a second lens module; and a driver configured to provide driving signals to the SMA wire group; and a position detector configured to detect positions of the first lens module and the second lens module from information received from the SMA wire group to generate analog signals, wherein the driver sequentially provides the driving signals to drive one of the first lens module and the second lens module in first periods, and drives a pair of SMA wires driving different lens modules of the first and the second lens modules in a same scheme.

The position detector may generate an analog signal from one of the first SMA wires driving the first lens module and the second SMA wires driving the second lens module, during second periods different from the first periods.

The driver may provide in the second periods driving signals to the first and the second SMA wires, except for the one of the first SMA wires and the second SMA wires from which the analog signal is generated, and an SMA wire paired with the one of the first SMA wires and the second SMA wires from which the analog signal is generated, during the second periods.

The first periods may alternate with the second periods.

The first periods may occur a plurality of times between the second periods.

The position detector may sequentially generate in the second periods analog signals from each of the first SMA wires and the second SMA wires.

The actuator may further include: a lens module accommodated in a frame, and configured to move in an X-axis direction or a Y-axis direction, perpendicular to an optical axis direction, wherein the first and the second SMA wires are connected to side surfaces of the lens module and the frame, respectively, to adjust a horizontal distance between the lens module and the frame.

The first SMA wire group may include first to fourth SMA wires and the second SMA wire group may include fifth to eighth SMA wires, and the driver may sequentially produce the driving signals to the first to fourth SMA wires, and sequentially produce the driving signals to the fifth to eighth SMA wires.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Figure 1:
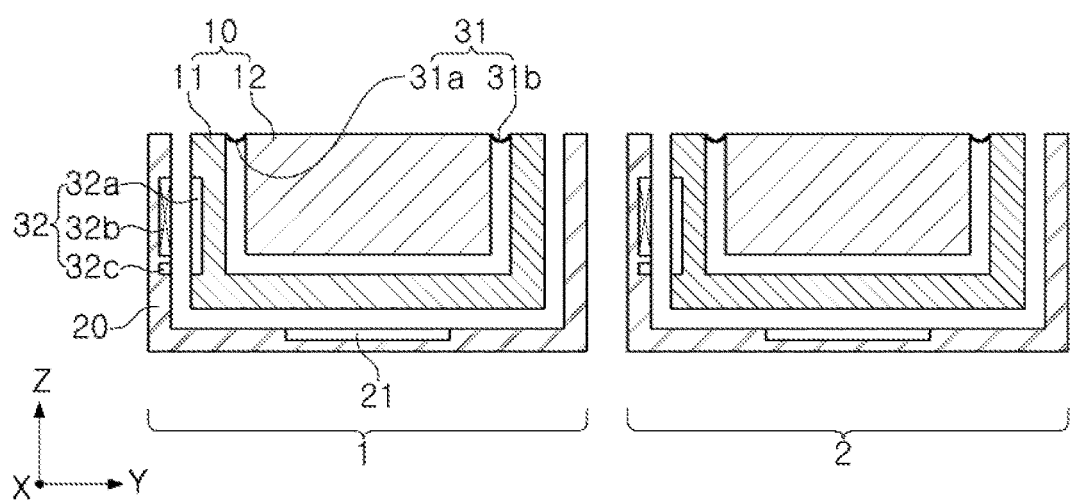
FIG. 1 is a cross-sectional view illustrating a dual camera module, according to an embodiment.

FIG. 1 is a cross-sectional view illustrating a dual camera module, according to an embodiment.

Referring to FIG. 1, the dual camera module, according to an embodiment, includes a first camera module 1 and a second camera module 2. Because structural/hardware configurations and operations/functions of the first camera module 1 and the second camera module 2 are similar to each other, the first camera module 1 will hereinafter be mainly described.

Referring to FIG. 1, a lens barrel 10 includes a frame 11 and a lens module 12. The lens module 12 has a hollow cylindrical shape so that at least one lens imaging a subject may be accommodated therein, and the lens may be provided in the lens barrel 10 along an optical axis. Here, an optical axis direction refers to a vertical direction, that is, a Z-axis direction, in the lens module 12 or a straight line passing through the geometrical center of a lens and joining the two centers of curvature of its surfaces. Sometimes the optical axis of a lens is called its principal axis. A number of lenses, being one or more, stacked in the lens module 12 may vary based on a target specification of the lens module 12. The lenses may have optical characteristics such as the same refractive index or different refractive indices, surface curvatures, or refractive powers. The lens module 12 is accommodated in the frame 11, and moves in at least two directions, that is, an X-axis direction and a Y-axis direction, perpendicular to the optical axis direction.

The lens barrel 10 is disposed and coupled to a housing 20. The lens barrel 10 moves in the optical axis direction in the housing 20 in order to perform auto-focusing. The housing 20 accommodates the lens barrel 10 therein so that the lens barrel 10 moves in the optical axis direction. Therefore, the housing 20 has an internal space formed therein to accommodate the lens barrel 10 therein. An image sensor 21 is disposed at a central portion of the housing 20 to face a lower portion of the lens barrel 10.

An optical image stabilization (OIS) actuator 31 drives the lens module 12 in the directions perpendicular to the optical axis direction and an auto-focusing (AF) actuator 32 drives the lens module 10 in the optical axis direction. The OIS actuator 31 is operated to perform an OIS function of the camera module, and the AF actuator 32 is operated to perform an AF function of the camera module.

The OIS actuator 31 generates a driving force enabling relative movement of the lens module 12 in the directions perpendicular to the optical axis direction, x-axis direction and y-axis direction, with respect to the frame 11. The OIS actuator 31 includes shape memory alloy (SMA) wires 31a and 31b, a driver integrated circuit (IC) providing driving signals to the SMA wires 31a and 31b, and a circuit to measure thermal resistances.

The SMA wires 31a and 31b are connected to side surfaces of the lens module 12 and the frame 11, respectively, to adjust a horizontal distance between the lens module 12 and the frame 11. The horizontal distance is a distance between the lens module 12 and the frame 11 in the directions perpendicular to the optical axis direction. FIG. 1 illustrates an example in which two SMA wires 31a and 31b are disposed in the Y-axis direction, but two additional SMA wires may be disposed in the X-axis direction. Alternatively, one SMA wire may be disposed in each of the X-axis direction and the Y-axis direction.

A shape memory alloy is an alloy having a shape memory effect that a shape of the alloy returns to an original shape when a phase of the alloy returns to an original shape in a case in which the alloy formed in the original phase is changed into another phase, and the abovementioned phase may correspond to heat, that is, a temperature. Therefore, the SMA wires 31a and 31b contract and expand due to heat generated when a current flows in the SMA wires 31a and 31b to be, thus, deformed. When the driving signals generated in the OIS actuator 31 are provided to the SMA wires 31a and 31b, the lens module 12 moves in the directions perpendicular to the optical axis direction as a result of the deformation of the SMA wires 31a and 31b due to the heat.

The OIS actuator 31 changes duty ratios, amplitudes, and other factors of the driving signals provided to the SMA wires 31a and 31b in order to move the lens module 12 to a target position. The OIS actuator 31 measures thermal resistances of the SMA wires 31a and 31b to detect a present position of the lens module 12. The SMA wires 31a and 31b are deformed by the driving signals, and the thermal resistances of the SMA wires 31a and 31b change depending on deformation levels of the SMA wires 31a and 31b. Therefore, the OIS actuator 31 measures the thermal resistances of the SMA wires 31a and 31b to measure the deformation levels of the SMA wires 31a and 31b, resulting in detection of the present position of the lens module 12.

The AF actuator 32 drives the lens barrel 10 in the optical axis direction. The AF actuator 32 includes a magnet 32a, a driving coil 32b, and a hall sensor 32c. The magnet 32a is disposed on one side surface of the frame 11, and the driving coil 32b is disposed in the housing 20 and faces the magnet 32a.

When a driving signal is provided to the driving coil 32b, a magnetic flux is generated in the driving coil 32b, and interacts with a magnetic field of the magnet 32a to generate driving force moving the lens barrel 10 in the optical axis direction depending on Fleming's left hand rule. The hall sensor 32c is disposed in the housing 20 to face the magnet 32a, and detects a position of the lens barrel 10 in the optical axis direction from the magnet 32a.

Figure 2:
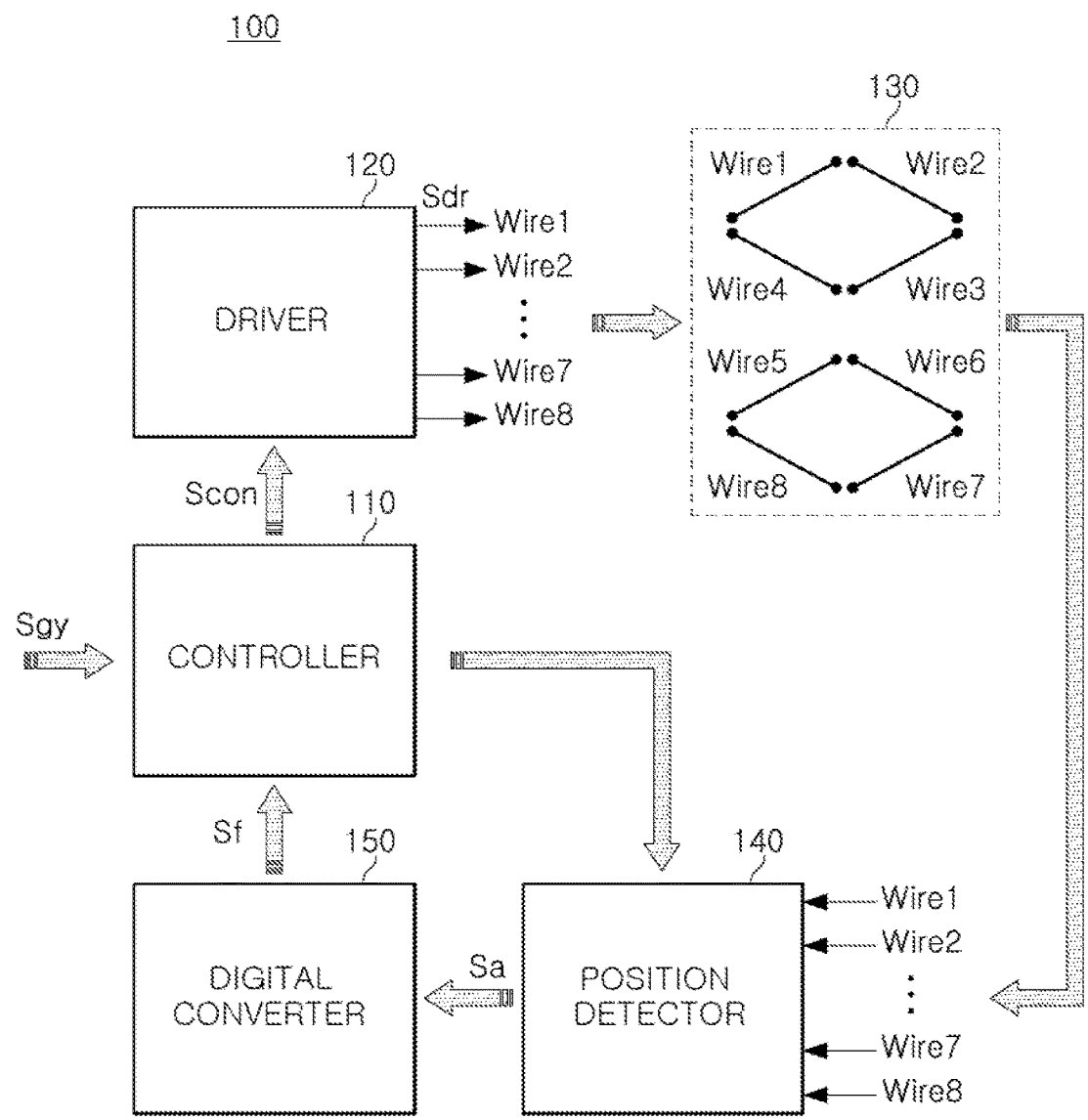
FIG. 2 is a block diagram illustrating an actuator used in the dual camera module, according to an embodiment.

FIG. 2 is a block diagram illustrating an actuator used in the dual camera module, according to an embodiment.

An actuator 100 according to the embodiment illustrated in FIG. 2, which corresponds to two OIS actuators 31 according to the embodiment illustrated in FIG. 1, performs an optical image stabilization function of the camera module.

The actuator 100 includes a controller 110, a driver 120, an SMA wire group 130, a position detector 140, and a digital converter 150. In this example, the controller 110, the driver 120, the position detector 140, and the digital converter 150 are provided in one driver integrated circuit (IC). The driver IC may be shared by two different OIS actuators, and a manufacturing cost of the actuators may, thus, be reduced. In an alternative embodiment, the controller 110, the driver 120, the position detector 140, and the digital converter 150 are included in one or more driver IC.

The controller 110 generates control signals Scon based on gyro signals Sgy input from an external source and feedback signals Sf, and provides or outputs the generated control signals Scon to the driver 120. A gyro sensor in the camera module or a mobile device may produce the gyro signals Sgy. A target position of the lens barrel is determined by the gyro signal Sgy. The gyro signal Sgy is generated from a shake or movement of the camera module or the mobile device sensed by the gyro sensor. Once the shake or movement is sensed by the gyro sensor, the gyro sensor generates the gyro signal Sgy through an integrator extracting angle information from angular velocity information, which is directly or indirectly output from the gyro sensor, and a high pass filter and a low pass filter removes direct current (DC) offset and high frequency noise.

The driver 120 generates driving signals Sdr based on a control signal Scon provided from the controller 110, and provides the generated driving signals Sdr to the SMA wire group 130. The driver 120 may adjust pulse widths of the driving signals Sdr based on the control signal Scon.

The SMA wire group 130 includes first to eight SMA wires Wire1 to Wire8. The first to fourth SMA wires Wire1 to Wire4 are operatively connected to one lens module, and the fifth to eighth wires Wire5 to Wire8 are operatively connected to another lens module. In operation, the first to fourth SMA wires Wire1 to Wire4 may be directly or indirectly, with another structural element therebetween, with the one lens module. In operation, the fifth to eighth SMA wires Wire5 to Wire8 may be directly or indirectly, with another structural element therebetween, with the other lens module.

The driver 120 sequentially produces the driving signals Sdr to a plurality of SMA wires driving any one lens module among SM wires of the SMA wire group 130, in one time period. One period may be understood as a time required to produce the driving signals Sdr, sequentially, to the SMA wires driving any one lens module or a set range of time between zero to a predetermined time.

As an example, the driver 120 sequentially produces the driving signals Sdr to the first to fourth SMA wires Wire1 to Wire4, and sequentially produces the driving signals Sdr to the fifth to eighth wires Wire5 to Wire8. In this example, pulse widths of the driving signals Sdr provided to the plurality of SMA wires driving any one lens module may be different from each other depending on a target position.

In accordance with an embodiment, the driver 120 includes one driving circuit in order to improve efficiency of system resources. The driver 120 selectively outputs or provides the same driving signal to a pair of SMA wires, each driving different lens modules, among the first to eighth SMA wires Wire1 to Wire8 at the same time in order to provide the driving signals to the first to eighth SMA wires Wire1 to Wire8 through one driving circuit. For example, the driver 120 outputs or provides the same driving signal to the first SMA wire Wire1 and the fifth SMA wire Wire5 at the same time, outputs or provides the same driving signal to the second SMA wire Wire2 and the sixth SMA wire Wire6 at the same time, outputs or provides the same driving signal to the third SMA wire Wire3 and the seventh SMA wire Wire7 at the same time, and outputs or provides the same driving signal to the fourth SMA wire Wire4 and the eighth SMA wire Wire8 at the same time.

The position detector 140 measures thermal resistances from the SMA wire group 130 to generate analog signals Sa. The thermal resistances of the SMA wire group 130 are measured to determine present positions of each of lens modules included in a dual camera module.

The digital converter 150 converts the analog signals from the position detector 140 into digital signals and outputs the digital signals as the feedback signals Sf. The digital converter 150, according to an embodiment, includes one analog to digital conversion circuit in order to improve the efficiency of the system resources. Therefore, one analog to digital conversion circuit sequentially receives the analog signals Sa in order to convert the analog signals Sa provided from the position detector 140 into the digital signals.

The analog to digital conversion circuit of the digital converter 150 may be operated in a sample and hold scheme to convert the analog signals sequentially provided from the position detector 140 into the digital signals. As an example, when the analog to digital conversion circuit is operated in the sample and hold scheme, in an example in which an analog signal is provided from any one SMA wire, the analog to digital conversion circuit is woken up from a standby mode to an operation mode by a start flag signal and re-enters the standby mode to standby for an input of sufficient analog signals, and may be again woken up to perform a digital conversion operation in response to set levels of analog signals being input.

The controller 110 controls the driver 120 and the position detector 140 to control generation timings of the driving signals Sdr and generation timings of the analog signals Sa, in order for the analog signals Sa to be sequentially input to the digital converter 150.

Figure 3:
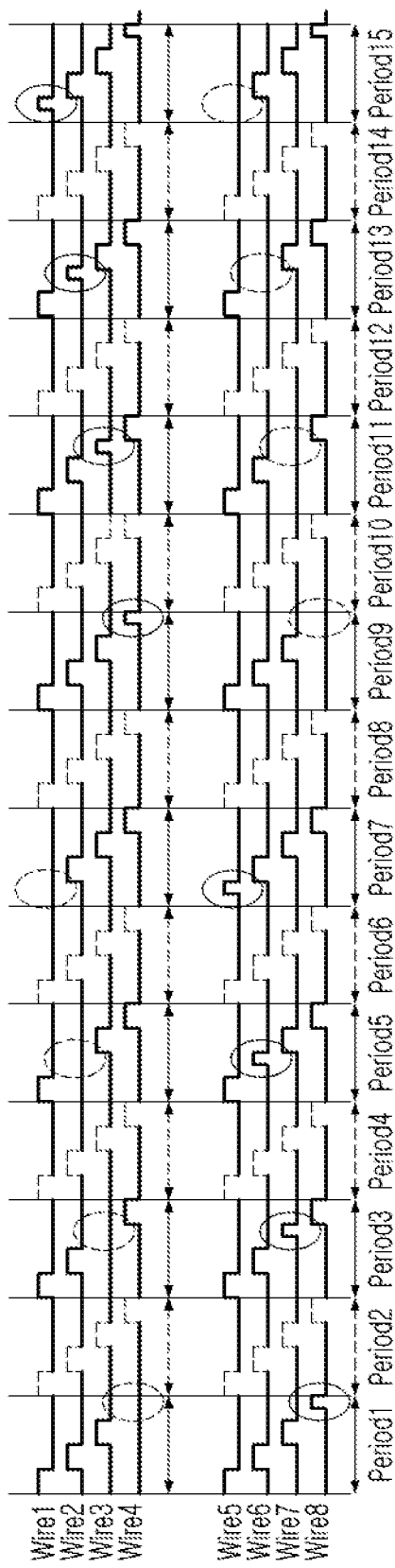
FIG. 3 illustrates generation timings of driving signals and generation timings of analog signals, according to an embodiment.

FIG. 3 illustrates generation timings of driving signals Sdr and generation timings of analog signals Sa, according to an embodiment.

The generation timings of the driving signals Sdr and the generation timings of the analog signals Sa will be described in detail with reference to FIGS. 2 and 3.

According to an embodiment, first periods in which the generation timings of the driving signals Sdr and the generation timings of the analog signals Sa exist together may occur, and second periods in which only the generation timings of the driving signals Sdr exist may occur. The first periods and the second periods may appear alternatively.

In FIG. 3, the first periods correspond to odd-numbered periods Period1, Period3, Period5, Period7, Period9, Period11, Period13, and Period15. The odd-numbered periods Period1, Period3, Period5, Period7, Period9, Period11, Period13, and Period15 correspond to periods in which the generation timings of the driving signals Sdr and the generation timings of the analog signals Sa exist together. In the odd-numbered periods Period1, Period3, Period5, Period7, Period9, Period11, Period13, and Period15, the driving signals are applied to some of the first to eighth SMA wires Wire1 to Wire8, and the analog signals are generated from the others of the first to eighth SMA wires Wire1 to Wire8.

In FIG. 3, the second periods correspond to even-numbered periods Period2, Period4, Period6, Period8, Period10, Period12, and Period14. The even-numbered periods Period2, Period4, Period6, Period8, Period10, Period12, and Period14 correspond to periods in which only the generation timings of the driving signals Sdr exist. In the even-numbered periods Period2, Period4, Period6, Period8, Period10, Period12, and Period14, the driving signals are applied to the first to eighth SMA wires Wire1 to Wire8.

The even-numbered periods Period2, Period4, Period6, Period8, Period10, Period12, and Period14 will be first described. The driver 120 sequentially generates or provides the driving signals Sdr to the plurality of SMA wires driving one lens module in the SMA wire group 130, in one period. In this example, the driver 120 provides the driving signals to the first to eighth SMA wires Wire1 to Wire8 through one driving circuit in order to improve the efficiency of the system resources. As a result, the driver 120 provides the same driving signal to the pair of SMA wires driving different lens modules among the first to eighth SMA wires Wire1 to Wire8 at the same time, as described above.

Then, the odd-numbered periods Period1, Period3, Period5, Period7, Period9, Period11, Period13, and Period15 will be described. In the odd-numbered periods Period1, Period3, Period5, Period7, Period9, Period11, Period13, and Period15, circles represented by solid lines refer to timings in which the analog signals Sa are generated. The position detector 140 generates only one analog signal in each of the odd-numbered periods Period1, Period3, Period5, Period7, Period9, Period11, Period13, and Period15 in order to sequentially provide the analog signals to the digital converter 150, which includes one analog to digital conversion circuit, in order to improve the efficiency of the system resources. In addition, the position detector 140 sequentially generates the analog signals from the first to eighth SMA wires Wire1 to Wire8 in odd-numbered periods Period1, Period3, Period5, Period7, Period9, Period11, Period13, and Period15 in order to improve accuracy in detecting the position of the lens module.

At the time that the analog signals Sa are generated, the driving signals Sdr may not be provided to SMA wires from which the analog signals Sa are generated in order to precisely determine the position of the lens module. In this example, the same driving signals Sdr are provided to the pair of SMA wires driving different lens modules. Therefore, the driving signals Sdr are not provided to SMA wires corresponding to the SMA wires from which the analog signals Sa are generated, as illustrated in circles represented by dotted lines in FIG. 3.

A case in which the odd-numbered periods Period1, Period3, Period5, Period7, Period9, Period11, Period13, and Period15 and the even-numbered periods Period2, Period4, Period6, Period8, Period10, Period12, and Period14 have the same periods is illustrated in FIG. 3. However, in order to improve the accuracy in detecting the position of the lens module, the odd-numbered periods Period1, Period3, Period5, Period7, Period9, Period11, Period13, and Period15 continuously appear by removing the even-numbered periods Period2, Period4, Period6, Period8, Period10, Period12, and Period14. In addition, in order to precisely move the lens module to a target position, the even-numbered periods Period2, Period4, Period6, Period8, Period10, Period12, and Period14 appear a plurality of times between the odd-numbered periods.

As set forth above, according to an embodiment, an actuator of a camera module is described of which a manufacturing cost is reduced by sharing the driver IC by actuators.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator of a camera module, comprising:
   a shape memory alloy (SMA) wire group comprising first SMA wires driving a first lens module and second SMA wires driving a second lens module; and
   a driver configured to drive a pair of SMA wires driving different lens modules of the first and the second lens modules among the first and the second SMA wires during a same function, and configured to sequentially provide driving signals to wires driving one of the first lens module and the second lens module in one time period.

2. The actuator claim 1, wherein the driver comprises a driving circuit generating a same driving signal as provided to the pair of SMA wires driving the first and the second lens modules.

3. The actuator of claim 2, wherein the driver simultaneously provides the same driving signal to the pair of SMA wires driving the different lens modules.

4. The actuator of claim 1, further comprising:
a position detector configured to measure thermal resistances from the first SMA wires driving the first lens module and the second SMA wires driving the second lens module to detect positions of the first lens module and the second lens module.

5. The actuator of claim 4, wherein the position detector sequentially generates analog signals from the first SMA wires driving the first lens module and the second SMA wires driving the second lens module.

6. The actuator of claim 5, further comprising:
a digital converter comprising an analog to digital conversion circuit configured to sequentially receive the analog signals and generate digital signals.

7. The actuator of claim 6, wherein the digital converter is operated in a sample and hold scheme.

8. The actuator of claim 5, wherein the driver does not provide the driving signals to the first and the second SMA wires from which the analog signals are generated, in the one time period.

9. The actuator of claim 6, further comprising:
a controller configured to generate control signals based on the digital signals,
wherein the driver adjusts pulse widths of the driving signals based on the control signals.

10. The actuator of claim 6, further comprising:
a lens module accommodated in a frame, and configured to move in an X-axis direction or a Y-axis direction, perpendicular to an optical axis direction,
wherein the first and the second SMA wires are connected to side surfaces of the lens module and the frame, respectively, to adjust a horizontal distance between the lens module and the frame.

11. The actuator claim 1, wherein the driver selectively and simultaneously outputs a same driving signal to a pair of SMA wires driving the first and the second lens modules, among the first and the second SMA wires, to provide the driving signals to the first and the second SMA wires through one driving circuit.

12. An actuator of a camera module, comprising:
a shape memory alloy (SMA) wire group comprising first SMA wires driving a first lens module and second SMA wires driving a second lens module;
a driver configured to provide driving signals to the SMA wire group; and
a position detector configured to detect positions of the first lens module and the second lens module from information received from the SMA wire group to generate analog signals,
wherein the driver sequentially provides the driving signals to drive one of the first lens module and the second lens module in first periods, and drives a pair of SMA wires driving different lens modules of the first and the second lens modules in a same scheme.

13. The actuator of claim 12, wherein the position detector generates an analog signal from one of the first SMA wires driving the first lens module and the second SMA wires driving the second lens module, during second periods different from the first periods.

14. The actuator of claim 13, wherein the driver provides in the second periods driving signals to the first and the second SMA wires, except for the one of the first SMA wires and the second SMA wires from which the analog signal is generated, and an SMA wire paired with the one of the first SMA wires and the second SMA wires from which the analog signal is generated, during the second periods.

15. The actuator of claim 14, wherein the first periods alternate with the second periods.

16. The actuator of claim 15, wherein the first periods occur a plurality of times between the second periods.

17. The actuator of claim 15, wherein the position detector sequentially generates in the second periods analog signals from each of the first SMA wires and the second SMA wires.

18. The actuator of claim 15, further comprising:
a lens module accommodated in a frame, and configured to move in an X-axis direction or a Y-axis direction, perpendicular to an optical axis direction,
wherein the first and the second SMA wires are connected to side surfaces of the lens module and the frame, respectively, to adjust a horizontal distance between the lens module and the frame.

19. The actuator of claim 12, wherein the first SMA wire group comprises first to fourth SMA wires and the second SMA wire group comprises fifth to eighth SMA wires, and the driver sequentially produces the driving signals to the first to fourth SMA wires, and sequentially produces the driving signals to the fifth to eighth SMA wires.

20. An actuator of a camera module, comprising:
first shape memory alloy (SMA) wires configured to drive a first lens module;
second SMA wires configured to drive a second lens module; and
a driver configured to sequentially provide driving signals to pairs of SMA wires in one time period, each pair of SMA wires comprising one of the first SMA wires and one of the second SMA wires.

* * * * *